US008057233B2

(12) United States Patent
Owen (10) Patent No.: US 8,057,233 B2
(45) Date of Patent: Nov. 15, 2011

(54) MANIPULABLE INTERACTIVE DEVICES (75) Inventor: Thomas Martin Owen, Bristol (GB)

(73) Assignee: Smalti Technology Limited, Holywell, Flintshire (GB)

( * ) Notice: Subject to any disclaimer, the term of this patent is extended or adjusted under 35 U.S.C. 154(b) by 933 days.

(21) Appl. No.: 11/142,955

(22) Filed: Jun. 2, 2005

(65) Prior Publication Data
US 2006/0215476 A1 Sep. 28, 2006

(30) Foreign Application Priority Data
Mar. 24, 2005 (GB) .................................. 0506159.3

(51) Int. Cl.
G09B 5/00 (2006.01)
A63H 33/04 (2006.01)

(52) U.S. Cl. ........ 434/169; 434/159; 434/160; 434/167; 434/171; 172/176

(58) Field of Classification Search .................. 434/159, 434/160, 167, 169, 172, 171, 176
See application file for complete search history.

(56) References Cited

U.S. PATENT DOCUMENTS

| 3,654,706 | A | * | 4/1972 | Perrella .......................... 434/176 |
| 4,342,904 | A | | 8/1982 | Onsager |
| 4,703,573 | A | * | 11/1987 | Montgomery et al. ........ 434/169 |
| 4,936,780 | A | * | 6/1990 | Cogliano ...................... 434/311 |
| 5,013,245 | A | * | 5/1991 | Benedict ....................... 434/170 |
| 5,072,414 | A | | 12/1991 | Buisker et al. |
| 5,119,077 | A | | 6/1992 | Giorgio |
| 5,146,566 | A | | 9/1992 | Hollis, Jr. et al. |
| 5,183,398 | A | | 2/1993 | Monte et al. |
| 5,188,533 | A | * | 2/1993 | Wood ............................ 434/169 |
| 5,228,859 | A | | 7/1993 | Rowe |
| 5,320,358 | A | * | 6/1994 | Jones ............................ 273/371 |
| 5,328,373 | A | * | 7/1994 | Wood ............................ 434/172 |
| 5,364,272 | A | * | 11/1994 | Herman et al. ............... 434/159 |
| 5,396,265 | A | | 3/1995 | Ulrich et al. |
| 5,511,980 | A | * | 4/1996 | Wood ............................ 434/169 |
| 5,823,782 | A | * | 10/1998 | Marcus et al. ................ 434/156 |
| 5,860,653 | A | * | 1/1999 | Jacobs .......................... 434/172 |
| 5,991,693 | A | * | 11/1999 | Zalewski ...................... 701/300 |

(Continued)

FOREIGN PATENT DOCUMENTS
EP  1 486 237  12/2004
(Continued)

OTHER PUBLICATIONS

Owen, Martin. A Teacher-centred Model of Development in the Educational Use of Computers, Technology, Pedagogy, and Education (1992), 1:1 p. 127-137, Informaworld.com <URL:http://www.informaworld.com/smpp/title~content=1716100724>.*

(Continued)

Primary Examiner — Nikolai A Gishnock
(74) Attorney, Agent, or Firm — Beyer Law Group LLP (57) ABSTRACT A manually manipulable device adapted to present an individual characterization to a user comprising a processor, a power source, a communications unit, a response generator, and a proximity sensor adapted to sense the close proximity of a similar device, such that a user can manipulate the device and generate a sensory response in the response generator or a response generator of another, at least similar, device, in accordance with the proximity of the other device.

22 Claims, 5 Drawing Sheets

U.S. PATENT DOCUMENTS

| | | | |
|---|---|---|---|
| 6,149,490 A * | 11/2000 | Hampton et al. | 446/353 |
| 6,271,453 B1 * | 8/2001 | Hacker | 84/476 |
| 6,309,275 B1 * | 10/2001 | Fong et al. | 446/297 |
| 6,327,482 B1 * | 12/2001 | Miyashita | 455/566 |
| 6,330,427 B1 | 12/2001 | Tabachnik | |
| 6,353,168 B1 * | 3/2002 | Sosoka et al. | 84/600 |
| 6,443,796 B1 * | 9/2002 | Shackelford | 446/91 |
| 6,462,264 B1 | 10/2002 | Elam | |
| 6,464,503 B1 * | 10/2002 | Heit et al. | 434/156 |
| 6,469,689 B1 | 10/2002 | Dow et al. | |
| 6,473,070 B2 | 10/2002 | Mishra et al. | |
| 6,491,523 B1 | 12/2002 | Altman | |
| 6,514,085 B2 | 2/2003 | Slattery et al. | |
| 6,551,165 B2 * | 4/2003 | Smirnov | 446/175 |
| 6,628,244 B1 * | 9/2003 | Hirosawa et al. | 345/2.3 |
| 6,652,457 B1 | 11/2003 | Skiba et al. | |
| 6,654,748 B1 | 11/2003 | Rabung et al. | |
| 6,679,751 B1 | 1/2004 | Maxwell et al. | 446/91 |
| 6,685,477 B1 * | 2/2004 | Goldman et al. | 434/172 |
| 6,685,479 B1 * | 2/2004 | Ghaly | 434/236 |
| 6,726,485 B2 * | 4/2004 | Marcus et al. | 434/156 |
| 6,729,881 B2 * | 5/2004 | Marcus et al. | 434/156 |
| 6,739,874 B2 * | 5/2004 | Marcus et al. | 434/156 |
| 6,755,655 B2 * | 6/2004 | Marcus et al. | 434/156 |
| 6,982,703 B2 | 1/2006 | Lapstun et al. | |
| 7,003,598 B2 | 2/2006 | Kavanagh | |
| 7,006,786 B2 * | 2/2006 | Marcus et al. | 434/362 |
| 7,018,210 B2 * | 3/2006 | Goldman et al. | 434/172 |
| 7,018,213 B2 * | 3/2006 | Marcus et al. | 434/322 |
| 7,029,283 B2 * | 4/2006 | Marcus et al. | 434/323 |
| 7,040,898 B2 * | 5/2006 | Marcus et al. | 174/504 |
| 7,050,754 B1 * | 5/2006 | Marcus et al. | 434/362 |
| 7,162,558 B2 | 1/2007 | Park | |
| 7,170,468 B2 * | 1/2007 | Knopf | 345/1.3 |
| 7,184,718 B2 * | 2/2007 | Newman et al. | 455/90.3 |
| 7,214,066 B2 * | 5/2007 | Marcus et al. | 434/323 |
| 7,217,135 B2 * | 5/2007 | Marcus et al. | 434/323 |
| 7,238,026 B2 * | 7/2007 | Brown et al. | 434/258 |
| 7,242,369 B2 * | 7/2007 | Huang | 345/1.1 |
| 7,316,567 B2 * | 1/2008 | Hsieh et al. | 434/171 |
| 7,336,256 B2 | 2/2008 | Parzygnat et al. | |
| 7,347,760 B2 * | 3/2008 | Wood et al. | 446/175 |
| 7,371,177 B2 * | 5/2008 | Ellis et al. | 463/42 |
| 2001/0049248 A1 | 12/2001 | Choi | 446/356 |
| 2002/0058235 A1 * | 5/2002 | Dinnerstein | 434/171 |
| 2002/0155783 A1 | 10/2002 | Chan | 446/335 |
| 2002/0160340 A1 * | 10/2002 | Marcus et al. | 434/156 |
| 2003/0027108 A1 * | 2/2003 | Marcus et al. | 434/156 |
| 2003/0027109 A1 * | 2/2003 | Marcus et al. | 434/156 |
| 2003/0027110 A1 * | 2/2003 | Marcus et al. | 434/156 |
| 2003/0031988 A1 * | 2/2003 | Marcus et al. | 434/156 |
| 2003/0139113 A1 * | 7/2003 | Wood et al. | 446/175 |
| 2003/0148249 A1 * | 8/2003 | Marcus et al. | 434/156 |
| 2004/0002042 A1 * | 1/2004 | Marcus et al. | 434/156 |
| 2004/0063078 A1 | 4/2004 | Marcus et al. | 434/156 |
| 2004/0063079 A1 * | 4/2004 | Marcus et al. | 434/156 |
| 2004/0091844 A9 * | 5/2004 | Marcus et al. | 434/156 |
| 2004/0121293 A1 * | 6/2004 | Marcus et al. | 434/156 |
| 2004/0142308 A1 * | 7/2004 | Marcus et al. | 434/156 |
| 2004/0142309 A1 * | 7/2004 | Marcus et al. | 434/156 |
| 2004/0142310 A1 * | 7/2004 | Marcus et al. | 434/156 |
| 2004/0142311 A1 * | 7/2004 | Marcus et al. | 434/156 |
| 2004/0146843 A1 * | 7/2004 | Marcus et al. | 434/307 R |
| 2004/0146844 A1 * | 7/2004 | Marcus et al. | 434/307 R |
| 2004/0214143 A9 * | 10/2004 | Marcus et al. | 434/156 |
| 2004/0214144 A9 * | 10/2004 | Marcus et al. | 434/156 |
| 2004/0219495 A1 * | 11/2004 | Marcus et al. | 434/156 |
| 2007/0009866 A1 * | 1/2007 | Marcus et al. | 434/171 |

FOREIGN PATENT DOCUMENTS

| | | |
|---|---|---|
| GB | 2 376 192 A | 12/2002 |
| RU | 2136342 | 9/1999 |
| WO | WO 00/35548 | 6/2000 |

OTHER PUBLICATIONS

Heinemann et al., *iClouds—Peer-to-Peer Information Sharing in Mobile Environments*, (pp. 1-10). International Conference on Parallel and Distributed Computing (Euro-Par 2003) Klagenfurt, Austria, Aug. 26-29, 2003. Retrieved from the Internet: <URL: http://iclouds.tk.infomatik.tu-darmstadt.de/icoulds/pdf/europar2003.pdf>.

Kortuem, Gerd, *Proem: A Peer-to-Peer Computing Platform for Mobile Ad-hoc Networks*, (pp. 1-6). Proceedings of Advanced Topic Workshop Middleware for Mobile Computing, Heidelberg, Germany, Nov. 16, 2001. Retrieved from the Internet: <URL: http://web.archive.org/web/2003116133920/http://www.cs.arizona.edu.mmc/10+kortuem.pdf>.

Watanabe et al., *The Soul of ActiveCube—Implementing a Flexible, Multimodal, Three-Dimensional Spatial Tangile Interface*, ACM Computers in Entertainment, vol. 2, No. 4, Oct. 2004, Article 6b. Retrieved from the Internet: <URL: http://www-human.ist.osaka-u.ac.jp/ActiveCube/AC-CIE.pdf>.

Laerhoven et al., *Using an Autonomous Cube for Basic Navigation and Input*. Proceedings of the 5$^{th}$ International Conference on Multimodal Interfaces, ICMI '03, Nov. 5-7, 2003. Retrieved from the Internet: <URL: http://ubicomp.lancs.ac.uk/ {villar/publications/icmipui-2003.pdf>.

International Search Report for International Application No. PCT/GB2006/001107, Dated Jul. 12, 2006.

Patents Act 1977: Search Report under Section 17 for Great Britain Patent Application No. GB30506159.3, Dated Nov. 17, 2005.

Camarata et al., *Navigating Information Space with Tangible Media*, ACM Conference on Intelligent Use Interforces, 2002.

Eisenberg et al., *Computation and Construction Kits: Toward the Next Generation of Tangible Building Media for Children*, Proceedings of Cognition and Exploratory Learning in the Digital Age (CELDA), Lisbon, Portugal, Dec. 2004.

Itoh et al., *TSU.MI.KI: Stimulating Children's Creativity and Imagination with Interactive Blocks*. Conference Creating, Connecting, and Collaborating Through Computing, 2004.

Gorbet et al., *Triangles: Tangible Interface for Manipulation and Exploration of Digital Information Topography*, Proceedings of CHI '98, Apr. 18-23, 1998, © 1998 ACM.

Block Jam, [online][retrieved Mar. 11, 2005], (6 pages). Retrieved from the Internet: <URL: http://www.csl.sony.co.jp/IL/projects/blockjam/contents.html>.

Bandai.com—What's New, *Bandai America Announces the Next Generation Tamagotchi: Tamagotchi Connection*, [online], Jun. 15, 2004. Retrieved from the Internet: <URL: http://www.bandai.com/news/news.cfm?wn_id=71>.

Tiletoy: Mar. 2005, *neighborhood watch*, [online], Mar. 9, 2005. Retrieved from the Internet: <URL: http://www.tiletoy.blogspot.com/2005_03_01_tiletoy_archive.html>.

Tiletoy: Feb. 2005, *Double vision*, [online], Feb. 22, 2005. Retrieved from the Internet: <URL: http://www.tiletoy.blogspot.com/2005_02_01_tiletoy_archive.html>.

Tiletoy: Dec. 2004, *Pixels in the air*, [online], Dec. 17, 2004. Retrieved from the Internet : <URL http://www.tiletoy.blogspot.com/2004_12_01_tiletoy_archive.html>.

Tiletoy, website found at http://www.tiletoy.blogspot.com/.

Tiletoy, website found at http://www.tiletoy.org/menu.html.

International Preliminary Report on Patentability for PCT/GB2006/001107 dated Mar. 13, 2007.

European Patent Office Examination Report for EPO Application No. 06 726 517.3 dated Mar. 10, 2009.

D6: The iClouds Project, Publications, Mar. 6, 2005, Retrieved from the Internet: URL: http://web.archive.org/web/20050306065830/http://iclouds.tk.infomatik.tu-darmstadt.de/iClouds/Publications.html.

Office Action in corresponding Russian application No. 2007139277, mailed Apr. 27, 2010.

Examination Report in corresponding Australian application No. 2006226156, mailed May 3, 2010.

"*Bandai America Announces the Next Generation Tamagotchi: Tamagotchi Connection*," URL: http://www.bandai.com/news/news.cfm?wn_id=71, Jun. 15, 2004, 2 pages.

"*Nintendo ds fact sheet*," URL: http://www.gamecubicle.com/hardware-nintendo_ds_spec_sheet.htm, Aug. 2004, 2 pages.

Office Action in corresponding European Application No. 06726517.3-2221, mailed Oct. 5, 2010.

U.S. Provisional Patent Application No. 60/642,565, filed Jan. 10, 2005.

Notice of Opposition in EP1899939 B1 and accompanying documents, mailed on Jul. 8, 2011.

Digital Cubes—A Dominoes Game using Electronic Cubes: Simon Schiessl published as part of UNPLUGGED—Art as the Scene of Global Conflicts Ars Electronica 2002 ARS Electronica 2002 Festival fur Kunst, Technologie and Gesellschaft Linz Sep. 7-12, 2002—retrieved from http://90.146.8.18/en/archives/center projekt ausgabe.asp?iProjectID=10931.

Physical Pixels by Kelly Bowman Heaton—Thesis Submitted to the Program in Media Arts and Sciences, School of Architecture and Planning, in partial fulfillment of the requirements for the degree of Master of Science in Media Arts and Sciences at the Massachusetis Institute of Technology Jun. 2000 and received into the Libraries, Jun. 21, 2000.

Moveable Objects, Mobile Code by Kwindla, Hultman Kramer, Submitted to the Program in Media Arts and Science in Media Arts and Sciences at the Massachusetis Institute of Technology and received in the Libraries Nov. 30, 1998.

Computationally-Enhanced Construction Kits for Children: Prototype and Principles, Eisenberg et al In Proceedings of ICLS (International Conference on the Learning Sciences), 2002, pp. 79-85.

* cited by examiner

MANIPULABLE INTERACTIVE DEVICES

FIELD AND BACKGROUND OF THE DISCLOSURE

This invention relates to a manually manipulable device, especially a device which is adapted to interact with a similar device or devices according to their relative locations so as to produce a sensory response for a user, such a device being especially suitable for educational or entertainment purposes.

SUMMARY OF THE DISCLOSURE

According to a first aspect, the invention consists of a manually manipulable device adapted to present an individual characterisation to a user comprising a processor, a power source, a communications unit, a response generator, and a proximity sensor adapted to sense the close proximity of a similar device, such that a user can manipulate the device and generate a sensory response in said response generator or a response generator of a similar device, in accordance with the proximity of one or more similar devices.

According to a second aspect, the invention consists of a set of two or more manually manipulable devices, each adapted to present an individual characterisation to a user and to be locatable relative to other such devices in multiple different arrangements, wherein each device comprises a processor, a power source, a response generator, and a communications unit, such that the devices generate a sensory response through said response generators in accordance with the arrangement of the devices selected by a user.

The characterisation may comprise visual display material or audio output material, and will vary depending on the particular application or purpose of the device or devices. For example, visual display material may comprise a letter or group of letters (e.g. phoneme) or word or words, and the sensory response may comprise speech corresponding to a word or phrase or sentence spelt out by the letters or words. In another application, visual display material may comprise a number or mathematical symbol, and the sensory response may comprise speech relating to mathematical properties of the numbers on the devices. In yet another application, visual display material may comprise a musical symbol and the sensory response may be an audio musical response. In an example in which the characterisation comprises audio output material, this may comprise the audio equivalent of any of the examples of visual display material given above.

In all of the above examples of the invention, the sensory response comprises an audio response which may be generated by one or more devices. Thus, each device incorporates an audio generator to provide an audio response. However, in other examples of the invention, the sensory response may instead, or in addition, comprise a visual response, which may be generated by one or more devices.

In a preferred embodiment of the invention, each device incorporates a visual display unit which displays visual display material and/or is able to generate a visual sensory response, which may be a static or animated visual display. Preferably, each device is programmable to allow the visual display material and the sensory response to be programmed to suit different applications, for example, to accommodate letters or words or numbers or musical symbols as described above, or any other visual display material, and to generate corresponding audio or visual responses.

Therefore, a device according to the invention is preferably a fully programmable, multifunctional device which can be adapted for use as a learning aid in relation to language, mathematics or music or other subjects. Such a device can be readily adapted to be used in the manner of known multi-component, educational apparatus such as Cuisinaire rods (used to teach arithmetic), dominoes and jigsaws, each component (rod, domino or jigsaw piece) being embodied in the form of a device according to the invention, which is then able to respond visually or audibly to enhance the experience of the user of the apparatus.

The communications unit incorporated in the device is adapted to communicate with similar devices with which it is used to co-ordinate the sensory response appropriate to an array of multiple devices. Each device communicates relevant information about itself corresponding to its characterisation and may be a simple identity code. The sensory response is made evident through one or more of the devices, and could include a separate response generator.

Communication of a sensory response to any device preferably occurs via the communications unit.

Preferably, the communications unit is a wireless device, that may be implemented using mobile telephone technology or the like.

Each device is preferably provided with a proximity sensor, or multiple proximity sensors, adapted to sense the proximity of a similar device in any one of multiple adjacent positions, for example, adjacent to each of multiple edges of the device. Each device is preferably further adapted to identify an adjacent device and to communicate information of both the identity and position of an adjacent device to other devices or to the central control unit via said communication unit so that an appropriate response can be generated.

The proximity sensor may comprise a magnetic or an electrical device, and may require physical contact between adjacent devices to be operational.

Preferably, a manually manipulable device according to the invention is constructed with a robust outer casing suitable for handling by a child aged 3 or older.

Preferably, a manually manipulable device according to the invention has registration features, such as protrusions and indents, in its outer surface that allow the device to be placed in registration with other such devices. Preferably, the registration features provide a visual guide during the registration process. The registration features may interlock adjacently located manually manipulable devices according to the invention. In one embodiment, a manually manipulable device according to the invention is arranged to provide an indication when registration with another such device is achieved. The indication may be audible or visible in nature.

Adjacent contacting edges of devices may be adapted to fit together or interlock only when correctly orientated so that both display said visual display material the same way up (i.e. top to bottom). A rectangularly shaped device may be adapted to be orientated with a similar device adjacent to each of its four side edges, and the proximity sensor is then adapted to sense each adjacent device.

In an alternative embodiment of the invention, the devices are used in conjunction with a board, tray or base on which they are placed and which is capable of identifying the location and identity of each device and communicating this to a central control unit of one or more of the devices so that they can generate the sensory response. The board itself may consist of a screen which is able to generate a display appropriate for the particular application and/or to generate the sensory response. In this alternative embodiment of the invention, the individual devices may not need to incorporate the proximity sensor because of the location sensing ability of the board.

In the above alternative embodiment, the board may be adapted so that it can recharge individual devices when placed in contact with it. Furthermore, this recharging feature may be provided in a board not having the device location capability.

A device according to the invention may also incorporate a camera that allows an image to be captured, this image being used as said visual display material on a visual display unit also incorporated in the device, or the image can be used in a visual sensory response.

A device according to the invention may also incorporate a microphone to allow sound to be captured and used in an audio sensory response.

A device according to the invention may also incorporate data input means in the form of a handwriting recognition device to input words, letters, symbols or numbers for use in characterisation of the device or programming a sensory response to be produced by the device.

It will be appreciated that an audio sensory response, such as incorporated in any of the embodiments described above, may take the form of a directional or stereo/audio response by arranging that two or more devices are controlled simultaneously or sequentially to generate appropriate sounds.

Programming of each device may be achieved by any of a number of different methods including connection to memory media such as smart cards or memory sticks; via a personal computer or hand-held computing device; or via said communications unit. In one example, each device may make use of the communications unit to receive information from a television broadcast so that the device is adapted for use in conjunction with a television programme being broadcast.

A device according to the invention is preferably further adapted so that it incorporates a user sensor sensitive to touch and/or movement so that it can trigger a characterisation output when handled by a user. The characterisation output may comprise a visual or audio output or both.

Specific technologies that can be used in embodiments of the invention include networked distributed intelligent small computers known as Specks or Motes; micro-electromechanical-systems MEMs, especially for audio components and sensors; and ZigBee radio or similar communications technology.

A manually manipulable device according to the invention is, from one aspect, a computing unit and as such can be designed to be a thin client in a client-server relationship with some other entity.

In one embodiment, a manually manipulable device according to the invention comprises a 32 Bit RISC (or better) CPU, memory, a graphics processor, an audio processor, a communications processor, internal data storage, a rechargeable power source and a touch-sensitive audio-visual display unit. The CPU is preferably capable of processing 200 Million Instructions Per Second (MIPS) or better. The CPU can preferably address 16 Mb (or better) of Random Access Memory. The graphics processor and visual display will preferably be capable of rendering screen resolutions of 160×160 pixels (or better) in 8 bit colour (or better). Other versions will be able to process full motion video at 12.5 frames per second (or better) with 16 bit colour (or better) synchronised to audio. Other versions will have live video or still image capture via a built-in camera. The audio processor will preferably be capable of playback of 4 bit, 4 kHz mono audio (or better) and polyphonic tones. Enhanced versions will feature audio recording capability. The internal storage may be provided by SECURE DIGITAL® (SD) cards, Multi-Media Cards MULTIMEDIACARDs® (MMC) or a hard disc arrangement. The communications processor will preferably include support for industry standard wireless protocols including BLUETOOTH® and in future will support other emergent protocols including IEEE 802.15.4 and other near field communication protocols. It is presently preferred that a manually manipulable device according to the invention will have a real time operating system (RTOS).

Video apparatus could for example involve the use of screens 5 cm×5 cm, but 8 cm×8 cm might also be acceptable. The screens could for example comprise thin film transistor TFT screens with an active matrix 2.5" (4:3), a resolution 880×228 RGB delta, pixel size 56.5×164 HM, fully integrated single-phase analogue display drivers, signal input voltage 3V, driver frequency 3 MHz, driver power consumption 15 MW.

The power source is preferably a rechargeable battery and might comprise a photovoltaic generator.

The user sensor may also sense manipulation of the device by a user indicative of a positioning movement of the device requiring an assessment of its proximity relative to similar devices and the need to generate a sensory response corresponding to one of said arrangements of devices.

According to a further feature of the invention, each of said manually manipulable devices incorporates a visual display unit to display visual display material, and two or more of said devices are adapted to be arranged in a row so that said visual display material "reads" in a meaningful manner along said row. A similar device is locatable adjacent to one side of said row of devices, and thereby triggers a change in the visual display material on said similar device so that it matches that of said row of devices. For example, said similar device can be located below said row of devices to acquire a combination of characters from the row above it. This device displaying said combination of characters can then be re-used in a further row of devices to create a new combination of characters.

Each device may have an ON/OFF switch to allow it to be reset to a start up condition, for example, displaying initial pre-programmed visual display material.

By way of example only, certain embodiments of the invention will now be described with reference to the accompanying drawings, in which.

BRIEF DESCRIPTION OF THE DRAWINGS

DETAILED DESCRIPTION OF THE DISCLOSURE

One embodiment of the invention consists of a set of blocks, say 12 blocks, each being rectangular in shape and adapted to be positioned edge-to-edge with other blocks on either side (referred to as left-hand and right-hand edge) in the manner of a row, and top edge and bottom edge in the manner of a column. Each block incorporates a display screen over most of its front or upper surface, which forms part of an electronic visual display unit capable of displaying visual display material according to display data derived from a database. In this embodiment, the visual display material consists of a lower case letter of the alphabet which is displayed on the screen when the block is first activated. Each block may incorporate a switch that allows it to be activated to deactivated, and operation of the switch initiates a start-up condition in which a pre-programmed letter is displayed. Programming of the blocks may be such that different combinations in a row can spell out fifteen to twenty different words appropriate for teaching a young child to read.

Each block incorporates a means of displaying its orientation as far as top and bottom is concerned, which may invoke the shape of the block or an indicator displayed in the display screen.

Each block further incorporates a proximity sensor or sensor adapted to allow it so sense the proximity of another block aligned edge-to-edge with it, preferably involving contact between said adjacent edges, either at the left hand edge or right-hand edge or top edge or bottom edge. The proximity sensor, or other ID sensor means independent of it, is adapted to sense the identity of each adjacent block.

Each block further incorporates a touch and/or movement sensor.

Each block further incorporates a wireless communications unit through which it can communicate with another block to transmit information relating to its own identity and visual display material and the identity and location of adjacent blocks and to receive information causing the visual display unit to change the visual display unit material.

Each block preferably further incorporates an audio generator which is adapted to produce an audio response in accordance with internal programming information received via the wireless communications unit.

It will be appreciated that a block with the communications, visual display and audio generator capability described above can be readily implemented using mobile telephone technology. Proximity sensors, ID sensors and touch and movement sensors can also be readily implemented using known technology. It will be appreciated that each block has its own power supply and incorporates a processor or processors which provide the required functionality.

A set of blocks is adapted to be sufficient in itself to provide the functionality described below with the processors operating in accordance with pre-programmed instructions and the inputs from the sensors of each so as to produce visual and audio responses in the blocks.

Figure 1:
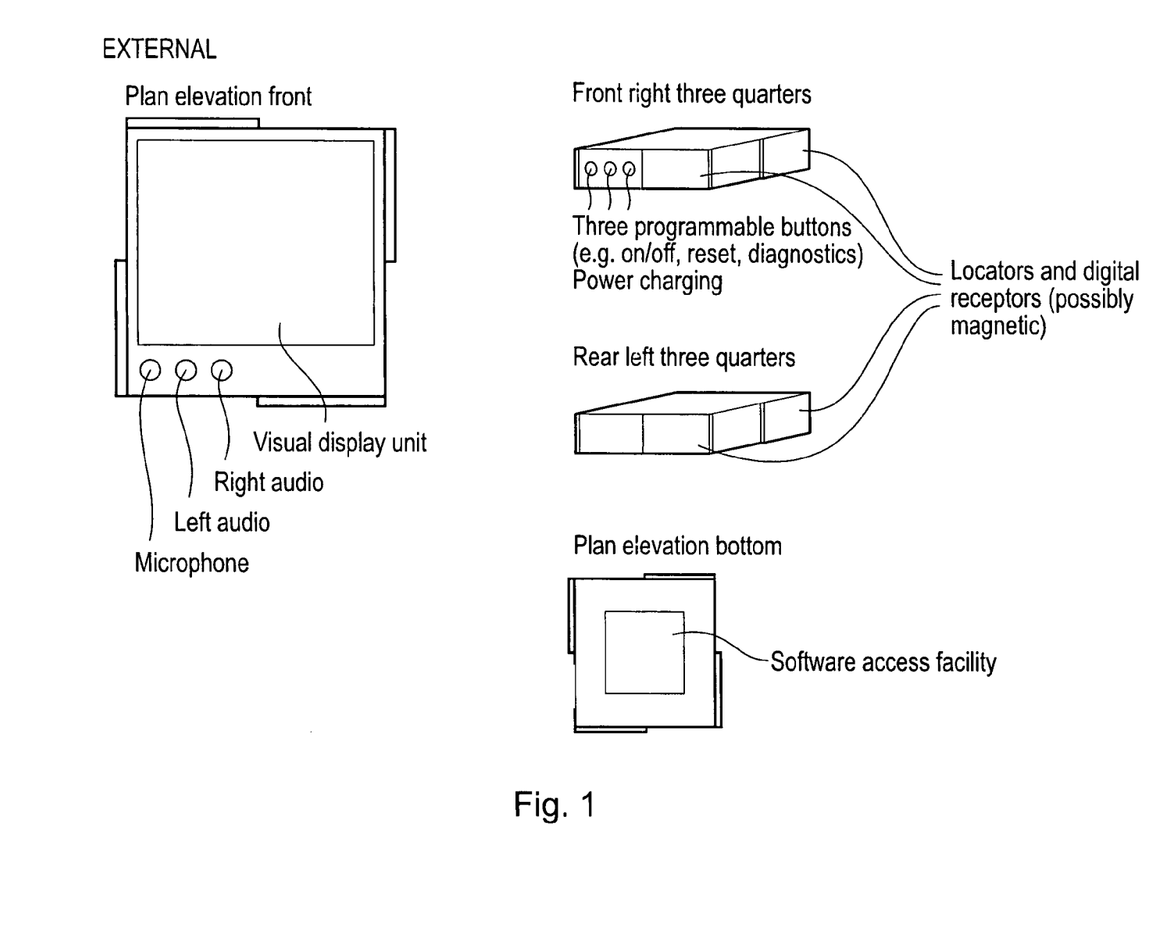
FIG. 1 illustrates the external physical constitution of an interactive block.
Figure 2:
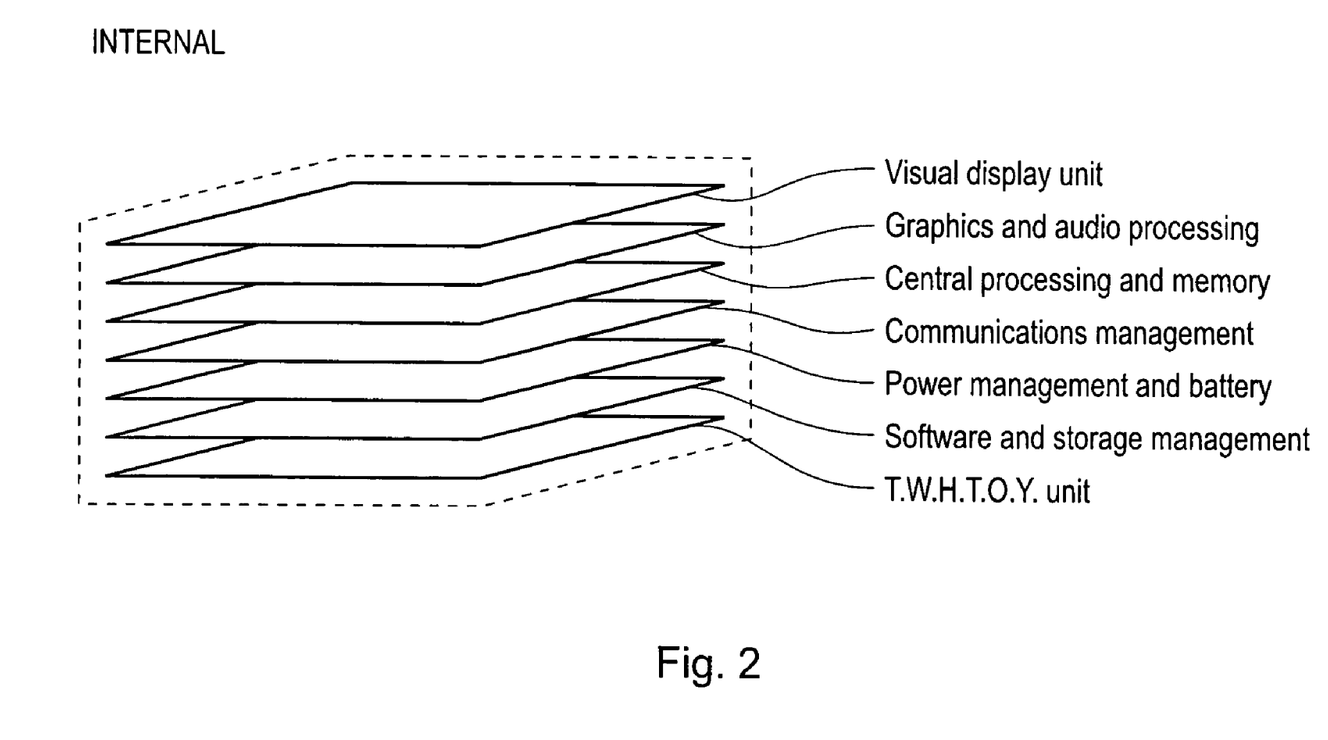
FIG. 2 illustrates, conceptually, the internal constitution of the interactive block of FIG. 1.
Figure 3:
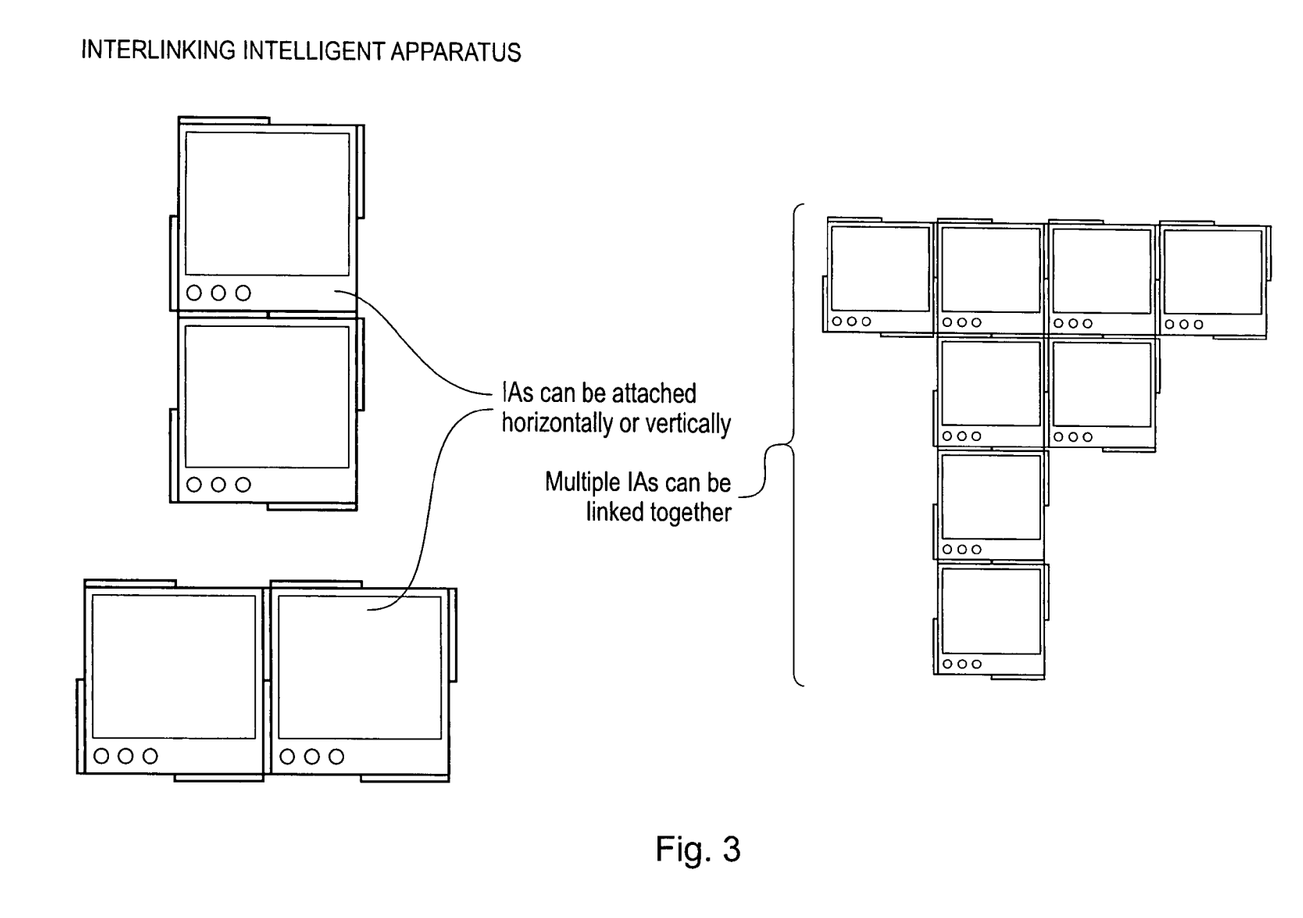
FIG. 3 illustrates how blocks of the kind illustrated in FIG. 1 can be connected in registration with one another.
Figure 5:
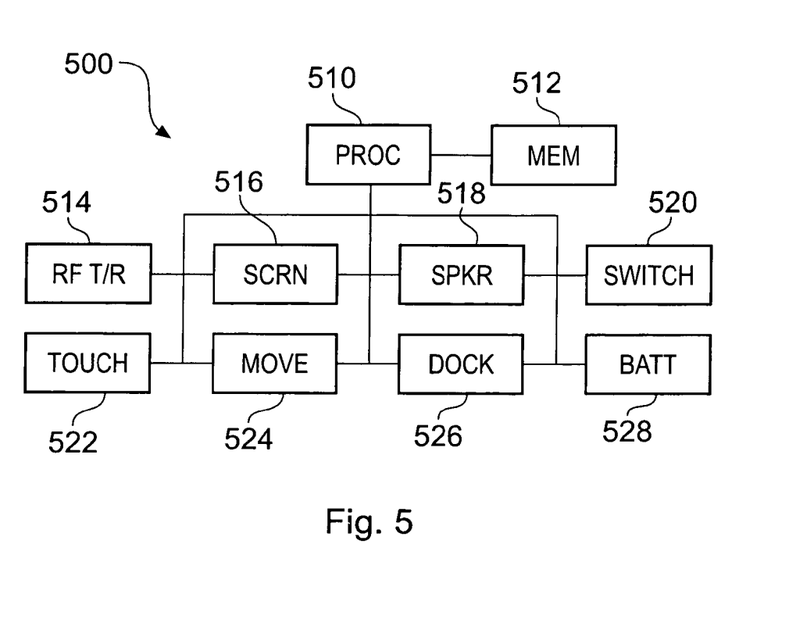
FIG. 5 illustrates schematically an interactive block.

The constitution of an example one of the blocks is shown in FIGS. 1, 2 and 5. The internal construction of a block is shown conceptually in FIG. 2 and in block diagram form in FIG. 5. FIG. 3 illustrates how blocks of this kind can be placed in registration with one another both vertically and horizontally.

FIG. 5 illustrates the main components of a block. It will, of course, be apparent to the skilled person that this is a high level diagram illustrating only key components of the block. As shown in FIG. 5, a block 500 comprises a processor 510, a memory 512, an RF transceiver 514, a screen 516, a speaker 518, a magnetic switch 520, a touch sensor 522, a movement sensor 524, a docking port 526 and a battery 528. The RF transceiver 514 enables the block 500 to communicate wirelessly with other, at least similar, blocks in the vicinity. The screen 516 and the speaker 518 allow visual and audio information to be presented to a user of the block 500. The magnetic switch 520 is activated by the proximity of another, at least similar, block. The touch sensor 522 is provided at the exterior of the block 500 to detect a user touching at least that area of the block 500. The movement switch 524 detects movement of the block 500 by a user. The docking port 526 is for receiving a memory card to load software/data into the block 500. The block 500 also includes a battery 528 that provides power to allow the various devices within the block to operate. The processor 510 processes, with the aid memory 512, information received from the RF transceiver 514, the switch 520, the touch sensor 522, the movement sensor 524 and the docking port 526 to cause, as appropriate, the RF transceiver 514 to communicate with other blocks and/or cause the screen 516 and/or the speaker 518 to present information to a user of the block 500.

Figure 6:
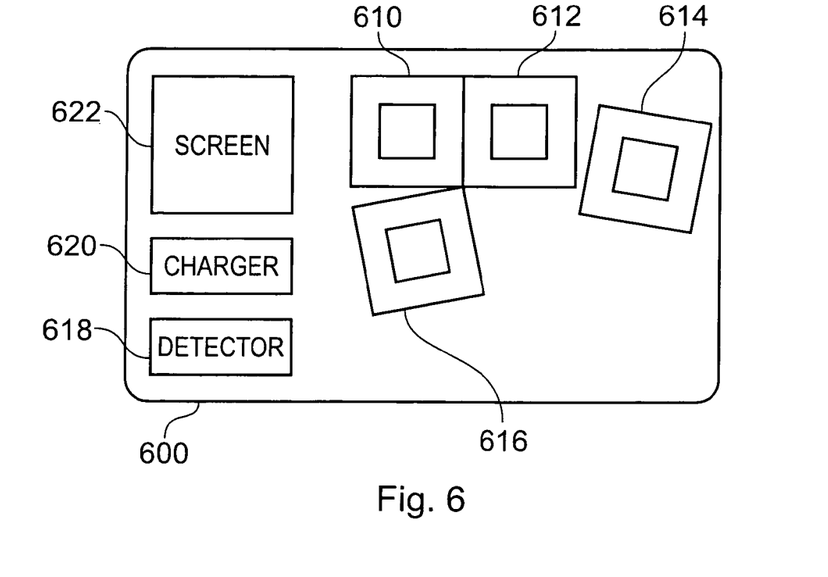
FIG. 6 illustrates schematically a tray or board which can interact with blocks of the kind shown in FIG. 5.

FIG. 6 shows a tray 600 for use with blocks, e.g. 610 to 616 of the kind described above with respect to FIGS. 1, 2 and 5. The board 600 comprises a detector 618 for determining the location and identity of blocks placed on the board. The board 600 also includes a charger for recharging the batteries of blocks that are placed on the board. The board also includes a screen 622 and is configured to present information to a user via the screen in response to interactions of the user with blocks on the board.

Examples of how the set of blocks can be used as alphabet blocks will now be now described.

Sam is four and a half. She's just started in her reception year at school where she's learning to read and write. Her parents are keen to help her learn at home and buy her a set of blocks with some preloaded reading software appropriate for her age.

Sam opens the box and takes out the blocks. Her parents are standing over, curious about how they work.

Each is displaying a different lower case letter.

She goes to pick one up and the unit sounds the letter it is displaying. For example, '/c/'. Moving each of the blocks she realises they all do the same.

In an alternative option, if there's 15 seconds inactivity, one block could say 'Try spelling a word, how about cat'. Alternatively pressing on a block could say, 'c sounds like /c/./c/ is for cat. Move the blocks together to spell cat?'

Sam puts two of the blocks next to each other. Starting with the one on the left, the blocks read in turn the letters they are displaying. For example '/d/, /o/'. They then read the combined sound. For this example the blocks would say 'do'.

When she puts three 'random' letters together ('/c/, /f/, /g/'), they make no sound.

She plays around with some different combinations until a word is spelt. For example, '/c/, 'a', 't'. You've spelt cat. Well done.' At this point a cat leaps onto the screen, runs around and miaows.

In an alternative option, the blocks prompt the child what to do next? For example, 'Now you can copy the word you've made onto its own block, by placing one below. Or you can try and spell another word.'

When Sam puts another block below the word she has spelt, the word jumps down onto that single block. It's says 'cat' when she presses it.

The three blocks that originally spelt the word are now free to be used for another word.

As described above, each block is individually responsive to touch or movement and reacts audibly and visually depending upon what it displays.

If each block is responsive to both touch and movement separately, then each can have a secondary response, such as giving an example of use.

If a letter is displayed, e.g. "c", the block sounds the letter as it is said in the alphabet and phonetically. For example, 'C. C sounds like /c/ for cat'. An animation may play on the screen relating to the letter and the example given. A secondary response might suggest what the user can do next? For example, 'Can you spell Cat?'

If a word is displayed e.g. "cat", the block sounds the phonetic letters for the word. For example, '/c/, /a/, /t/ spells cat'. An animation relating to the word plays on the screen. A secondary response might suggest the spelling of another word from the available letters if this is possible.

If a phonetic sound is displayed e.g. "ch", the block sounds the combined phonetic sound '/ch/ as in lunch'. The screen displays an animation of some food being eaten.

When blocks are placed next to each other they react depending what is on each. This could be a phonetic sound e.g. '/ch/', a word e.g. 'cat' or random letters e.g. '/k/, /r/, /f/'.

If the user places individual blocks alongside each other then they respond according to the combination of letters they display.

If a phonetic sound is created "ch", the blocks sound the combined sound, '/ch/'. They could also give a short example of use '/ch/ as in lunch, yum, yum, yum'.

If a word is created "cat", the blocks sound the individual letters followed by the word. For example, '/c/, /a/, /t/, spells cat. Well done, you've spelt cat'. The displays play a short animation. In this example a picture of a cat running between the two blocks. This happens whenever one of the joined blocks are pressed.

If a new word is created (plural or completely new) by adding a letter or letters to a current word of phonetic sound, the response might be, for example, '/c/, /a/, /r/, /t/, spells cart. Are you coming for a ride?' or '/c/, /a/, /t/, /s/ spells cats. Here they come!'. The displays animate according to the word spelt if the word has an associated animation in database. So in the above examples, a horse and cart could drive on and off the screens, or several cats could start playing around.

If a random set of letters are placed next to each other. For example '/d/, /f/, /r/, /g/', no sound is generated and no animation is displayed.

Animation and sound will only be available for some of the words that can be created using the blocks, as stated in a related response database held in one or each block or a central control unit.

If a user places one block adjacent the top edge of another, the lower block inherits the property of the upper block. Placing multiple blocks above or below will also cause a reaction between the blocks. For example, if the user places one block above another, and the top block shows '/b/' and the lower block shows '/b/', the lower block will also become a '/b/'.

A user can place a word spelt out over several blocks onto one block by placing a block below. This could also be used to join a '/c/' and an '/h/' on a single '/ch/' block.

If a user has spelt a word or phonetic sound using three individual blocks, for example, '/c/', '/a/' and '/t/' spelling 'cat', the user can then place a fourth block anywhere under the three letter blocks and the word "cat" moves onto a single block. However, if a user tries to copy two random letters onto a single block it will not work. For example '/g/' and '/f/' cannot be joined on a single '/gf/' block.

Likewise if the user has two word blocks that don't make a third word, they cannot be copied onto a single block. For example 'cat' and 'sat' cannot be joined to make a 'catsat' block.

If a user has the word cat on a single block and wants to split it into three separate letters, they need to place three blocks below the word block. The three letters each go into their own block in right to left order below.

Figure 4:
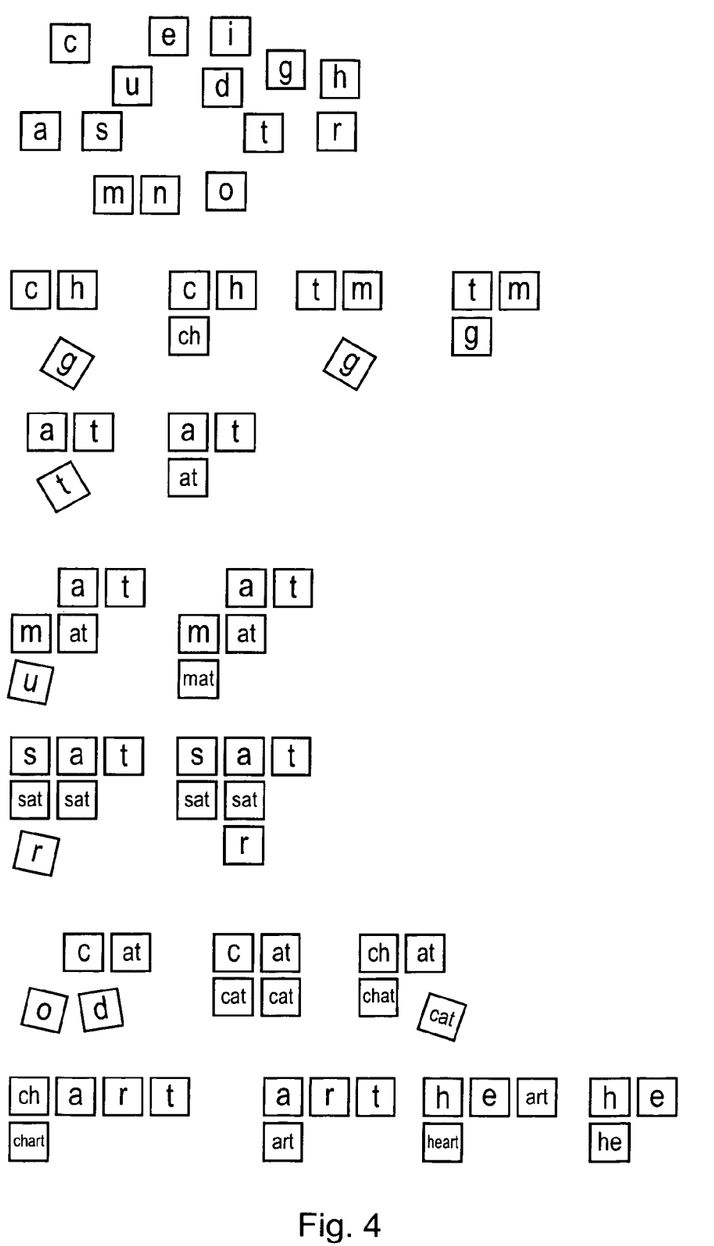
FIG. 4 illustrates how blocks of the kind shown in FIG. 1 can be used in a learning activity.

An example of use of a set of alphabet blocks operating according to the above principles is illustrated in FIG. 4, in a number of steps 1-6.

1. Blocks are taken out of the box and arranged on the floor.
2. User puts '/c/' and '/h/' together, the blocks sound '/ch/'. They put '/g/' underneath and copy '/ch/' onto it. Trying to copy '/t/', '/m/' onto '/g/' doesn't work.
3. '/a/' and '/t/' are joined to make 'at' and copied onto a single block.
4. '/m/' is put in front of 'at' to make 'mat'. The individual '/a/' and '/t/' blocks are still joined to the top of 'at', but have no direct effect to the '/m/' as they are not directly above but to one side. '/u/' is put below the '/m/' of 'mat' and 'mat' is copied onto the single block, which is then removed (not illustrated).
5. A '/s/' block is put in front of the '/a/' and '/t/' blocks to spell 'sat'. As the '/m/' of 'mat' is now below the '/s/' block the word 'sat' is copied onto it. 'sat' is also copied onto the 'at' block. The two 'sat' blocks don't interact with each other as a new word or sound hasn't been created. Likewise when a 'r' block is placed below either of the 'sat' blocks nothing is copied down.
6. Using the blocks here is a chain of various words that can be created following the principles described in the functional specifications.

The invention is applicable to diverse areas, which include but are not limited to, play, entertainment, adornment and decoration, environment, industry and learning (of, for example, languages, mathematics and musical skills/knowledge).

Play applications may include a variety of playful games using the blocks and, optionally, a tray of the type mentioned in the introduction. These include new games as well as enhancements of typical existing board and card games with additional features (by virtue of the fact the pieces (blocks) can change their image and emit sounds) and the board (interactive base) can also change its image. Further, new forms of toy such as farmyards and zoos can be created and become elements of animated stories.

In relation to adornment and decoration, in the educational context, IA blocks can be worn as badges that can enable students to role play their various functions (letters, sounds, numbers) and interact with other badge-wearing children to form words, tunes and equations. Beyond this, IA blocks have implicit emotive, aesthetic, interactive, and descriptive capabilities. Blocks in combination can be used to trigger social and artistic interactions between people or create more complex installations.

In environment and industrial settings variations of the devices can enable audio and visual data/systems alone or in combination (e.g. for health and safety measurement and control).

The invention claimed is:

1. A learning game method making use, in play, of a set of at least two manually manipulable interactive blocks each having a changeable individual characterization, each interactive block having:

a processor arranged to control operation of the block;
a power source providing power to the block;
a visual display unit arranged to display visual display material, the visual display material presenting said changeable individual characterization of its respective interactive block in a form selected from the group consisting of: a letter; a group of letters; and a word;
a response generator;
a communication unit configured, in use, to effect communication with at least a second of said at least two blocks of the set; and
a proximity sensor configured to sense proximity and determine relative position of at least said second of said at least two interactive blocks,
the method comprising the steps of:

on a first block, generating and presenting a first individual characterization selected from the group consisting of: a first letter; a first group of letters; and a first word;

on a second block different and separable from the first block, generating and presenting a second individual characterization selected from the group consisting of: a second letter; a second group of letters; and a second word;

locating the first and second blocks proximate to each other, the step of locating causing positioning of the first and second blocks in one of a multiplicity of different relative positions;

determining a relative position between the first and second blocks;

establishing communication between the first and second blocks, the communication permitting acquisition by said processors of an understanding of the presented first and second individual characterizations;

in the event that said relative position between the first and second blocks results in production of a meaningful interaction between the first and second individual characterizations wherein the meaningful interaction produces one of a phoneme or a word arising from the combination and relative position of the first individual characterization with the second individual characterization, generating a sensory output from said response generator of at least one of said first and second blocks to announce the meaningful interaction; and after generation of an interaction that follows relative positioning of the first block, having the processor execute a selective change to the presented individual characterization, the change producing a new changeable individual characterization presented on the visual display unit in a form selected from the group consisting of:

i) a new letter;

ii) a phoneme formed from a combination and relative position of the first and second individual characterizations; and iii) a word formed from a combination and relative position of the first and second individual characterizations.

2. The learning game method according to claim 1, the method further including:
in response to a meaningful interaction, having the response generator of each of said first and second interactive blocks operate to sound out the letter, phoneme or word presented on its visual display unit as its respective individual characterization.

3. The learning game method according to claim 1, the method further including:
in response to a meaningful interaction, sounding out a phoneme or word resulting from the combination and relative positions of individual characterizations presented on the first and second interactive blocks.

4. The learning game method according to claim 1, the method further including:
in response to a meaningful interaction, generating and displaying an image on the visual display unit, the image representing the word formed by the combination and position of the individual characterizations presented on the first and second interacting blocks.

5. The learning game method according to claim 1, in which said sensory response comprises a visual display on the visual display of one or more of said blocks.

6. The learning game method according to claim 1, wherein moving the first and second blocks to different relative positions produces different sensory outputs for said first and second individual characterizations.

7. The learning game method according to claim 1, wherein the set includes at least a third block having:
a processor arranged to control operation of the block;
a power source providing power to the block;
a visual display unit arranged to display visual display material, the visual display material presenting a third changeable individual characterization in a form selected from the group consisting of: a third letter; a third group of letters; and a third word;
a response generator;
a communication unit configured, in use, to effect communication with said first and second interactive blocks; and
a proximity sensor configured to sense proximity and determine relative position of said first and second interactive blocks,
the method comprising the steps of:
locating the third block proximate to the first and second blocks, the step of locating causing positioning of the third block in one of a multiplicity of different positions relative to the first and second blocks;
determining a relative position between the first, second and third blocks;
establishing communication between the first, second and third blocks, the communication permitting acquisition by said processors of an understanding of the presented first, second and third changeable individual characterizations;
in the event that said relative position between the first, second and third blocks results in production of a meaningful interaction between at least the first and second individual characterizations wherein the meaningful interaction produces one of a phoneme or a word arising from the combination and relative position between the first and second individual characterization, generating a sensory output from said response generator of at least one of said first, second and third blocks to announce the meaningful interaction.

8. The learning game method according to claim 7, the method further including:
in response to a meaningful interaction, having the response generator of each of said first, second and third interactive blocks operate to sound out the letter, phoneme or word presented on its visual display unit as its respective individual characterization.

9. The learning game method according to claim 8, the method further including:
in response to a meaningful interaction, sounding out a phoneme or word resulting from the combination and relative positions of individual characterizations presented on the first, second and third interactive blocks.

10. The learning game method according to claim 8, the method further including:
in response to a meaningful interaction, generating and displaying an image on the visual display unit, the image representing the word formed by the combination and position of the individual characterizations presented on the first, second and third interacting blocks.

11. The learning game method according to claim 7, wherein the step of having to the processor execute a change of the presented individual characterization further comprises:
generating a new changeable individual characterization on the third block reflecting:
i) the individual characterizations presented on the first and second blocks at the time of their interaction;

ii) the meaningful interaction taking place between the first and second individual characterizations; and iii) the relative position of between the first, second and third blocks.

12. A learning game apparatus comprising:
an individual manually manipulable interactive block having a changeable individual characterization, the block being programmable for playing a language learning game, the individual interactive block having:
a processor arranged to control operation of the block;
a power source providing power to the block;
a visual display unit arranged to display visual display material, the visual display material presenting said changeable individual characterization of its respective interactive block based on the learning game;
a response generator;
a communication unit; and
a proximity sensor,
the individual manually manipulable interactive block configured to display a changeable individual characterization for the language learning game and interact with at least one other manually manipulable interactive block programmed to play the same language learning game with each of the other blocks having at least its own processor, power source, visual display, response generator, communication unit, and proximity sensor;
the individual manually manipulable interactive block, in response to user manipulation changing the relative position of the individual block proximate to the at least one other block, establishing communication with the at least one other block permitting acquisition by said processor in said individual manually manipuable block of an understanding of the displayed individual characterizations and a relative position of at least those blocks brought into interacting proximity with each other; and
the individual manually manipulable interactive block, after detecting a meaningful interaction between characters from the combination and relative position of individual characterizations of blocks in interacting proximity with each other, having the processor of the individual manually manipulable interactive block selectively bring about a change to the presented individual characterization, the change producing display of a new changeable individual characterization associated with the language learning game.

13. The learning game apparatus of claim 12, wherein the change to the individual characterization presented on the visual display unit in the individual block includes a generation of a static or dynamic animation associated with a word of the language learning game.

14. The learning game apparatus of claim 12, wherein the change to the individual characterization presented on the visual display unit of the individual block includes a change in the characterization resulting in a change of a displayed letter.

15. The learning game apparatus of claim 12, wherein the change to the individual characterization presented on the visual display unit of the individual block includes generation of a word of the language learning game.

16. The learning game apparatus of claim 12, wherein the change to the individual characterization presented on the visual display unit of the individual block comprises generating an image on the visual display unit of the individual block.

17. The learning game apparatus of claim 12, wherein the changeable individual characterization of the individual block prior to said meaningful interaction is selected from the group consisting of: a first letter; a first group of letters; and a first word; and
in the event that said relative position between the blocks results in production of a meaningful interaction wherein the meaningful interaction produces one of a phoneme or a word, the blocks interacting to generate an auditory or visual output to announce the meaningful interaction;
after detecting the meaningful interaction, selectively allowing a change of the individual characterization presented on the individual manually manipulable interactive block.

18. A learning game system comprising:
a plurality of manually manipulable interactive blocks each having a changeable individual characterization, each block being programmable for playing a learning game, each interactive block having:
a processor arranged to control operation of the block;
a power source providing power to the block;
a visual display unit arranged to display visual display material, the visual display material presenting said changeable individual characterization of its respective interactive block based on the learning game;
a response generator;
a communication unit; and
a proximity sensor,
the manually manipulable interactive blocks in the learning game system configured to interact with each other in response to user manipulation of the blocks, wherein:
on each block of the plurality of blocks, each block displays a changeable individual characterization for the selected learning game;
the plurality of blocks, in response to user manipulation changing the relative position of the blocks, establish communication with other proximate interacting blocks to permit acquisition by said processors in said blocks of an understanding of the displayed individual characterizations and a relative position of at least those blocks brought into interacting proximity with each other;
the plurality of blocks detect whether said relative position between the blocks brought into interacting proximity with each other and the respective individual characterizations results in production of a meaningful interaction, the meaningful interaction arising from a combination and relative position of the individual characterizations of those blocks in close interacting proximity and their relative position;
in response to the detection of a meaningful interaction, the blocks generating an auditory or visual sensory output or both an auditory and visual sensory output to announce the meaningful interaction to the user as part of the learning game;
after detecting a meaningful interaction between characters from the combination and relative position of individual characterizations of at least blocks in interacting proximity, having the processor of at least one block selectively effect a change to its presented individual characterization, the change producing display of a new changeable individual characterization associated with the learning game.

19. The learning game system of claim 18, wherein the change to the individual characterization presented on the visual display unit in at least one block associated with the learning game includes at least one of the generation of an animation associated with a word, a change to a letter, and the generation of a word of the learning game.

20. A learning game system comprising:
a set of at least two manually manipulable interactive blocks each having a changeable individual characterization, each interactive block having:
  a processor arranged to control operation of the block;
  a power source providing power to the block;
  a visual display unit arranged to display visual display material, the visual display material presenting said changeable individual characterization of its respective interactive block in a form selected from the group consisting of: a letter; a group of letters; and a word;
  a response generator;
  a communication unit configured, in use, to effect communication with at least a second of said at least two blocks of the set; and
  a proximity sensor configured to sense proximity and determine relative position of at least said second of said at least two interactive blocks,
the set of blocks in the learning game system configured to interact with each other in response to user manipulation of the relative position of at least two blocks into proximate position with respect to each other into one of a multiplicity of different relative positions wherein:
on a first block, a first individual characterization is generated and presented selected from the group consisting of: a first letter; a first group of letters; and a first word;
on a second block different and separable from the first block, a second individual characterization is generated and presented selected from the group consisting of: a second letter; a second group of letters; and a second word;
the first and second set of blocks establishing communication permitting acquisition by said processors of an understanding of the presented first and second individual characterizations and a relative position between the first and second blocks;
in the event that said relative position between the first and second blocks results in production of a meaningful interaction between the first and second individual characterizations wherein the meaningful interaction produces one of a phoneme or a word arising from the combination and relative position of the first individual characterization with the second individual characterization, the first and second blocks generating an auditory or visual output from said response generator of at least one of said first and second blocks to announce the meaningful interaction; and
after the generation of an interaction that follows relative positioning of the first block, having at least one of the first and second block execute a change to its presented individual characterization, the change producing a new changeable individual characterization presented on the visual display unit in a form selected from the group consisting of:
i) a new letter;
ii) a phoneme formed from a combination and relative position of the first and second individual characterizations; and
iii) a word formed from a combination and relative position of the first and second individual characterizations.

21. A learning game system comprising:
a plurality of manually manipulable interactive blocks each having a changeable individual characterization, each interactive block having:
  a processor arranged to control operation of the block;
  a power source providing power to the block;
  a visual display unit arranged to display visual display material, the visual display material presenting said changeable individual characterization of its respective interactive block in a form selected from the group consisting of: a letter; a group of letters; and a word;
  a response generator;
  a communication unit; and
  a proximity sensor,
the manually manipulable interactive blocks in the learning game system configured to interact with each other in response to user manipulation of the blocks, wherein:
  on each block of the plurality of blocks, each block configured or arranged to display a changeable individual characterization selected from the group consisting of: a first letter; a first group of letters; and a first word;
  the plurality of blocks, in response to user manipulation changing the relative position of the blocks and bringing the blocks into interacting proximity, establishing communication with each interacting block to permit acquisition by said processors in said blocks of an understanding of the displayed individual characterizations and a relative position of those blocks in interacting proximity;
  the plurality of blocks detecting whether said relative position between the blocks brought into interacting proximity with each other results in production of a meaningful interaction between the individual characterizations, wherein the meaningful interaction produces one of a phoneme or a word arising from the combination and relative position of the individual characterizations; and
  in response to the detection of the meaningful interaction, the blocks generating a sensory output to announce the meaningful interaction to the user, the sensory output including changing a visual display response on the display unit of at least one of the interacting blocks, wherein the change to the visual display response is a change associated with a language learning game and is selected from the group consisting of:
  generating a change to an image,
  generating a static animation,
  generating a dynamic animation,
  generating a change to a display character, and
  generating a word.

22. A learning game system comprising:
at least three manually manipulable interactive blocks each having a changeable individual characterization, each interactive block having:
  a processor arranged to control operation of the block;
  a power source providing power to the block;
  a visual display unit arranged to display visual display material, the visual display material presenting said changeable individual characterization of its respective interactive block in a form selected from the group consisting of: a letter; a group of letters; and a word;
  a response generator;
  a communication unit; and
  a proximity sensor,
the manually manipulable interactive blocks in the learning game system configured to interact with each other in response to user manipulation of the blocks, wherein:

on each block of the at least three blocks, each block displays a changeable individual characterization selected from the group consisting of: a first letter; a first group of letters; and a first word;

the at least three blocks, in response to user manipulation changing the relative position of the blocks and bringing the blocks into interacting proximity, establishing communication with each other to permit acquisition by said processors in said blocks of an understanding of the displayed individual characterizations and a relative position of at least those blocks brought into proximity with each other;

the blocks detect whether said relative position between the blocks brought into interacting proximity with each other results in production of a meaningful interaction between respective individual characterizations, wherein the meaningful interaction occurs between at least two blocks and produces one of a phoneme or a word arising from the combination and relative position of the first individual characterization presented by said at least two interacting blocks;

in response to the detection of a meaningful interaction, at least one of said at least two blocks in interacting proximity generating a sensory output to announce the meaningful interaction to the user, and after the generation of an interaction, changing the individual characterization presented on the visual display unit in a third block under selective control of its respective processor, wherein the change in the individual characterization presented on the visual display unit of the third block consists of at least one of:

i) a new letter;

ii) a phoneme formed from a combination and relative position of the first and second individual characterizations; and iii) a word formed from a combination and relative position of the first and second individual characterizations.

\* \* \* \* \*